June 16, 1936. W. E. GUNDELFINGER 2,044,388
HANDLE STRUCTURE FOR CORN POPPERS AND THE LIKE
Filed May 27, 1935
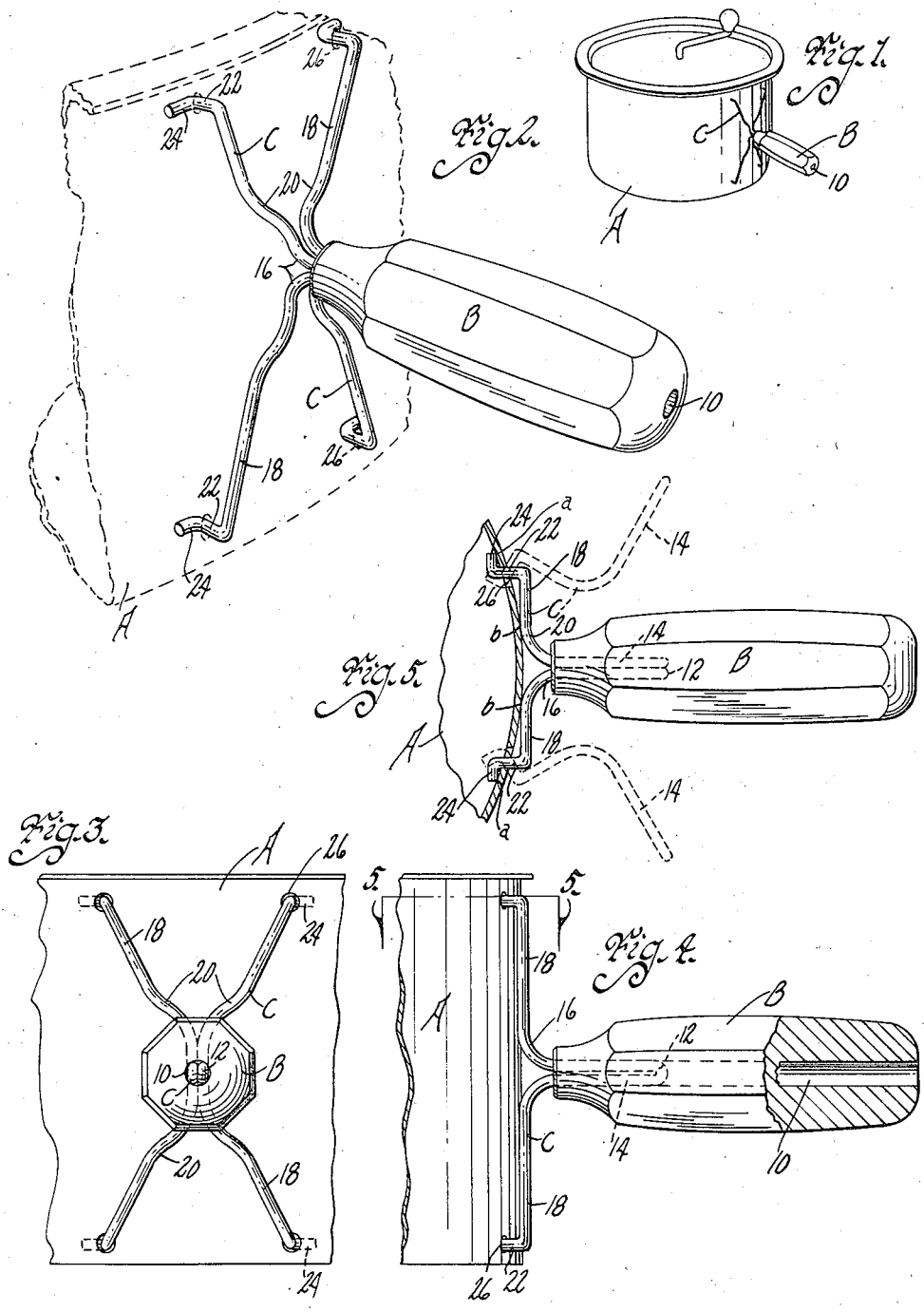

Patented June 16, 1936

2,044,388

UNITED STATES PATENT OFFICE 2,044,388

HANDLE STRUCTURE FOR CORN POPPERS AND THE LIKE

William Edward Gundelfinger, St. Louis, Mo., assignor to Knapp-Monarch Company, St. Louis, Mo., a corporation of Missouri Application May 27, 1935, Serial No. 23,690

10 Claims. (Cl. 16—114)

An object of my invention is to provide a removable handle structure especially adapted for corn poppers and the like, the structure being comparatively simple and inexpensive from a manufacturing standpoint.

A further object is to provide a handle element for a popper kettle or the like and means to rigidly connect the handle therewith when desired consisting of a pair of connecting elements readily operable to supportingly engage the popper kettle and the handle element then being associated therewith to thus connect the handle element to the popper kettle.

More particularly, it is my object to provide connecting elements which have shanks and diverging portions, the diverging portions terminating in hooks adapted to enter perforations of a popper kettle or the like and the parts being so shaped that when the handle element receives the shanks, the hooks and intermediate portions of the connecting elements engage the kettle under tension so that the handle element is then rigid with respect to the kettle.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of my handle structure connected with a corn popper kettle.

Figure 2 is an enlarged perspective view of the handle structure showing a portion of the kettle in dotted lines.

Figure 3 is a rear end elevation of the handle structure attached to the kettle.

Figure 4 is a side elevation of the same; and

Figure 5 is a sectional view on the line 5—5 of Figure 4.

On the accompanying drawing I have used the reference character A to indicate generally a popper kettle. My handle structure consists of a handle element B and a pair of connecting elements C. The handle structure is adapted for supporting the kettle when the handle is held in the hand of the user or for supporting any other type of kettle or device, the handle structure being universally adapted to many types of electric appliances or other utensils.

The handle element B may be made of wood, Bakelite or the like and is provided with a socket or bore 10. Each connecting element C is preferably formed of heavy wire doubled as indicated at 12 to form a pair of parallel portions 14 constituting a shank to be received in the bore 10.

The element C further includes bends at 16 whereby diverging arms 18 are formed. Between the bends 16 and the arms 18 are bends or curves 20 which are provided for bearing purposes which will hereinafter be referred to. The terminal ends of the arms 18 are bent to form portions 22 and 24 constituting hooks.

The popper kettle A is provided with a plurality of spaced perforations 26 to receive the hook portions 22—24. Referring to Figure 5, the handle element B may be removed from the shanks 14 and the elements C then swung to the dotted line positions whereupon the hooks 22—24 can be disengaged from the perforations 26 for thus easily and quickly disengaging the handle structure from the kettle.

The handle parts B and C can then be placed within the kettle so that they do not project out in the way and take up storage space when the popper or other utensil to which the handle is secured, is not in use.

When it is desired to use the utensil, however, the handle may be quickly replaced by positioning the elements C in the position shown by dotted lines in Figure 5 for inserting the hook ends in the perforations of the kettle and then the elements C can be swung to their full line position and the handle B manipulated so that its bore 10 receives the shanks 14.

The parts are of such dimensions relative to the diameter of the kettle A and the distance between the perforations 26 and the connecting elements C are so spaced that when the handle B is in supporting position the hooks 22—24 engage the kettle A adjacent the perforations 26 as indicated at (a) in Figure 5. The bearing portions 20 engage the outer surface of the kettle wall at (b). Thus the parts are placed under tension so that the handle member B is rigid relative to the kettle A when the handle structure is in use.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a handle structure, a pair of wire elements each being doubled, the two parts of the doubled portion thereof extending substantially parallel for a distance and then bending and diverging, the terminal ends being formed to provide hooks adapted to enter spaced perforations in a popper kettle or the like and a handle member having a bore to receive the doubled portions of each of said pair of wire elements and thereby cause the bends of said wire elements to engage the outer surface of the popper kettle and the hooks to engage the kettle adjacent said perforations with both engagements under tension for the purpose of mounting the handle member rigidly relative to the popper kettle.

2. In a handle structure, a pair of elements each doubled to form a shank and then bent and diverging, the terminal ends being formed to provide hooks adapted to enter spaced perforations in a popper kettle or the like and a handle member having a bore to receive said shanks of said pair of elements and thereby cause said hooks to engage said kettle adjacent said perforations with the parts under tension for thus rigidly mounting said handle member relative to said popper kettle.

3. In a handle structure, a pair of attaching elements and a handle element, each attaching element comprising a shank, a pair of arms diverging from one end thereof and hooks on the ends of said arms adapted to engage in perforations of a container wall, said shank being received in said handle element and said arms engaging said container wall at points spaced from the perforations therein.

4. In a handle structure, a pair of attaching elements and a handle element, each attaching element comprising a shank, a pair of arms diverging from one end thereof and hooks on the ends of said arms, said shanks being received in said handle element, said arms at their point of divergence being adapted to engage the side of a popper kettle or the like having perforations in said side and said hooks being each adapted to engage in one of said perforations whereby such engagements in conjunction with each other provide rigid connection of said handle element relative to said popper kettle.

5. In a handle structure, a pair of attaching elements and a handle element, each attaching element comprising a shank, a pair of arms diverging from one end thereof and hooks on the ends of said arms, said hooks being adapted for engagement in perforations of a popper kettle or the like and said shanks being received in said handle element for connecting the handle element rigidly to the kettle and said arms having portions spaced from said hooks to engage the outer wall of said kettle when said shanks are received in said handle element.

6. For use with a container having a plurality of spaced openings in its wall, a removable handle element and means for rigidly connecting said handle element with said container comprising a pair of connecting elements, each having a shank received in said handle, a central part to bear against the outer surface of the wall of said container when said shanks are so received and ends diverging from the central part, said ends being extended through said openings to the interior of said container and bearing against the inner surface of the wall thereof when said shanks are so received in said handle element.

7. For use with a container having a plurality of spaced openings therein, a removable handle element and means for rigidly connecting said handle element with said container comprising a pair of connecting elements, each having a shank received in said handle, and arms at one end of said shank diverging therefrom and received in said perforations, the intermediate portions of said connecting elements engaging the wall of said container under tension when said shanks are received in said handle.

8. In a handle structure, a pair of elongated elements, each in two parts, a portion of each part extending substantially parallel for a distance and the two parts then diverging, their terminal ends having hooks adapted to enter spaced perforations in a container, and a handle member having a bore to receive the parallel portions of each of said pair of elongated elements and thereby cause the diverging portions thereof to engage the outer surface of the container and the hooks to engage the container adjacent said perforations with both engagements under tension for the purpose of mounting the handle member rigidly relative to the container.

9. In a handle structure, a pair of elements each having two parts, a portion of each part forming a shank and another portion of each part diverging with the terminal ends of said last two portions having hooks adapted to enter spaced perforations in a container, and a handle member having a bore to receive said shanks of said pair of elements and thereby cause said hooks to engage said container adjacent said perforations with the parts under tension for thus rigidly mounting said handle member relative to said container.

10. A removable handle structure comprising a handle element and a pair of connecting elements each having a shank and diverging arms, said shank being slidably received in said handle, the ends of said arms being offset from the intermediate portions thereof to form hooks for connection with a container wall at four spaced points, said intermediate portions forming bearing elements which bear against a container wall to tension the connection of the hooks when said shanks are brought together and received in said handle element.

WILLIAM EDWARD GUNDELFINGER.